No. 685,300. Patented Oct. 29, 1901.
E. T. SHELLEY.
THRESHING MACHINE.
(Application filed Dec. 8, 1900.)
(No Model.) 2 Sheets—Sheet 1.
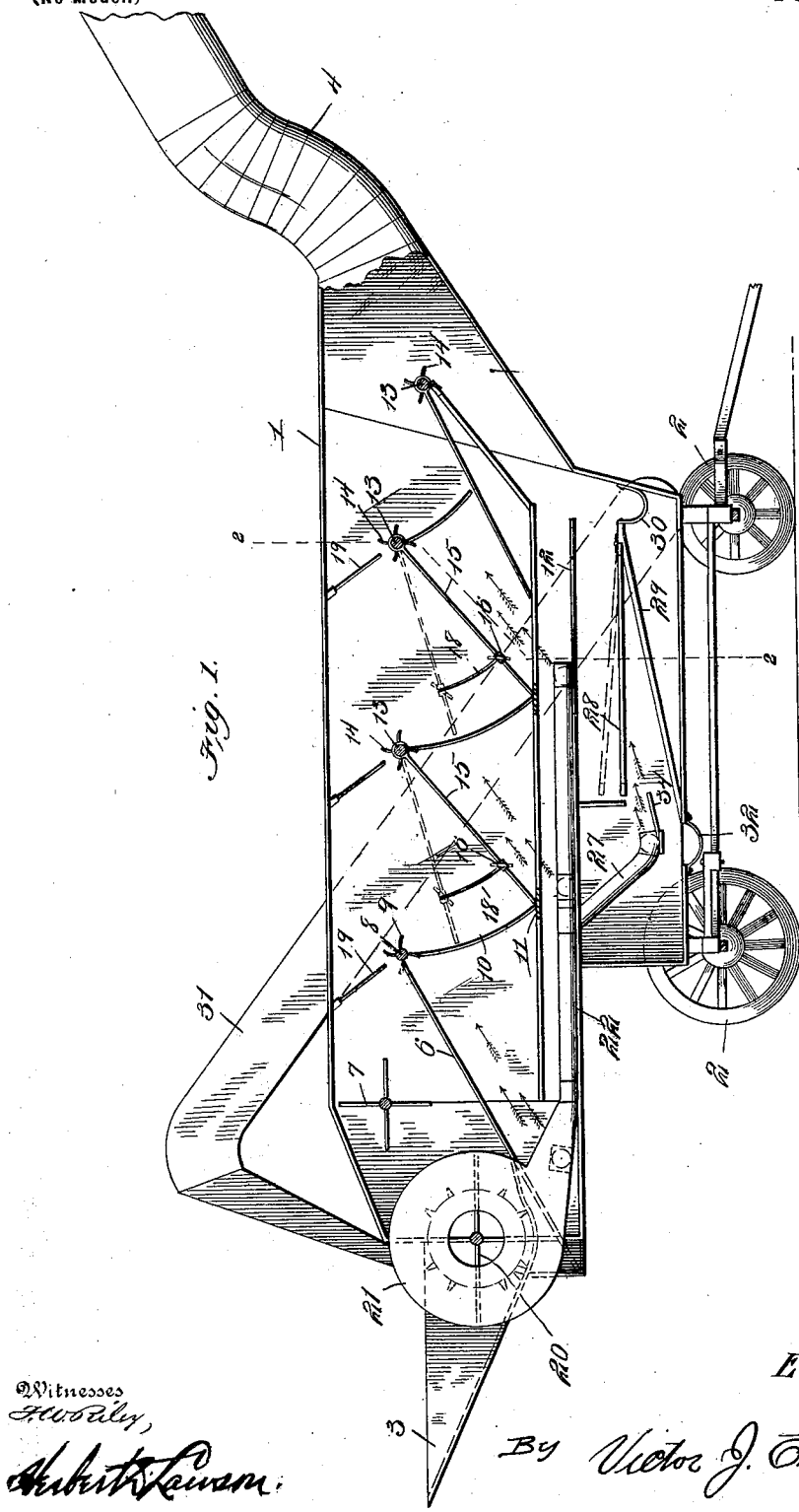
Witnesses
Inventor
E. T. Shelley,
By Victor J. Evans
Attorney

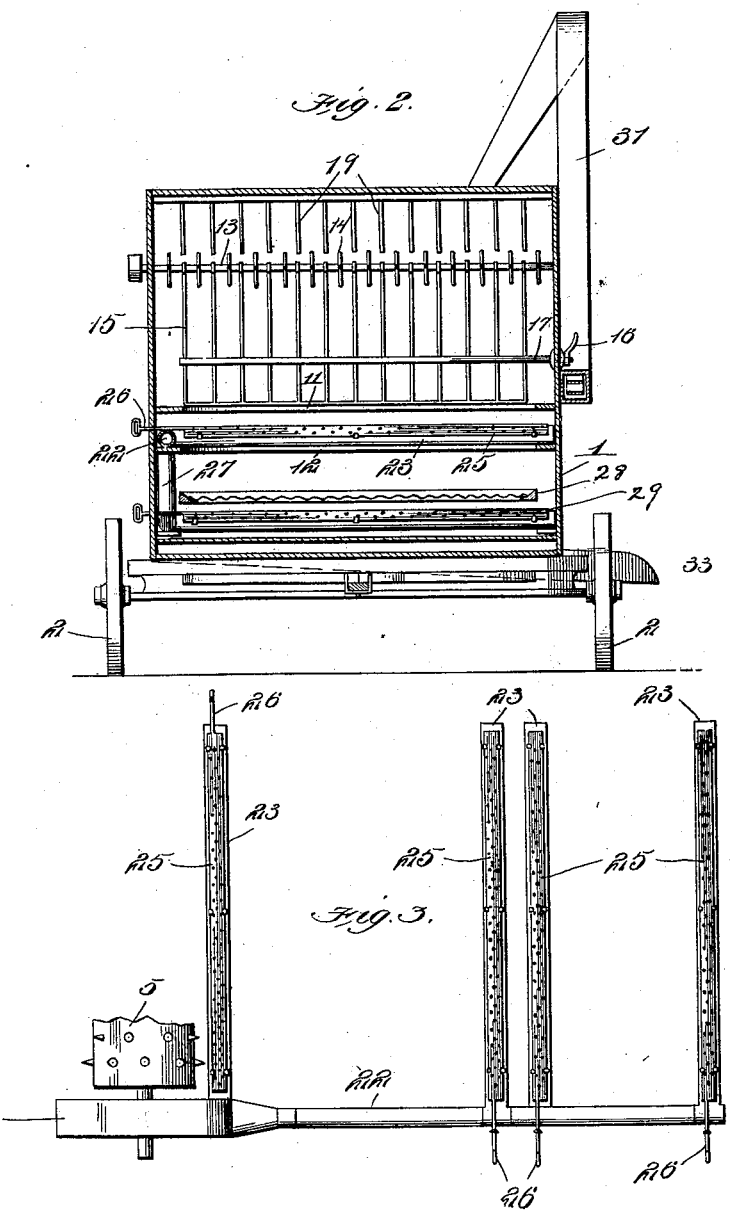

UNITED STATES PATENT OFFICE.

EDWIN T. SHELLEY, OF LONG PRAIRIE, MINNESOTA, ASSIGNOR OF TWO-THIRDS TO HARRISON C. NICKEY, OF BROWERVILLE, MINNESOTA, AND JESSE C. SHELLEY, OF TODD COUNTY, MINNESOTA.

THRESHING-MACHINE.

SPECIFICATION forming part of Letters Patent No. 685,300, dated October 29, 1901.

Application filed December 8, 1900. Serial No. 39,205. (No model.)

*To all whom it may concern:*

Be it known that I, EDWIN T. SHELLEY, a citizen of the United States, residing at Long Prairie, in the county of Todd and State of Minnesota, have invented new and useful Improvements in Threshing-Machines, of which the following is a specification.

This invention relates to new and useful improvements in threshing-machines; and its object is to provide a device of this character which is simple, durable, compact, and which requires the utilization of the minimum amount of power to operate the same.

A further object is to provide a device of this character employing an air-blast in lieu of the cylinders and shaking-screens heretofore employed.

The invention consists in the novel construction and combination of parts hereinafter more fully described and claimed, and illustrated in the accompanying drawings, showing the preferred form of my invention, and in which—

Figure 1 is an elevation of the interior mechanism of the device. Fig. 2 is a section on line 2 2, Fig. 1. Fig. 3 is a plan view of the blower and its attachments detached, and Fig. 4 is an enlarged view of a branch pipe of the blower.

Referring to said views by numerals of reference, 1 is the casing of the machine, suitably mounted, as upon wheels 2, and provided with a hopper 3 and a straw-stacker 4 at opposite ends thereof.

Mounted within the casing at the base of the hopper is a cylinder 5, adjacent to which is mounted an upwardly-inclined apron 6, which is operated in any suitable manner. A beater, as 7, is suitably arranged above the apron and adjacent to the cylinder for the purpose hereinafter described. At the upper end of the apron 6 is mounted a horizontally-extending shaft 8 and to which are secured at desired intervals prongs or teeth 9, substantially as shown in the drawings. Extending downwardly from this shaft to the rear of the apron 6 are parallel fingers 10, the lower ends of which are secured to a cross-strip 11, arranged at a point above the bottom 12 of the upper portion of the casing. Additional shafts 13, similar in construction to the shaft 8, hereinbefore described, are suitably arranged within the casing, preferably in a horizontal plane with said shaft, and each shaft is provided with teeth 14, similar in construction and arrangement to the teeth 9.

Rattles 15 are inclined downward toward the cylinder from each of the shafts 13, and these rattles are adjustable vertically, pivoting upon the shafts 13 and adapted to be held in adjusted position in a suitable manner, preferably by means of a thumb-nut 16, mounted upon the end of an arm 17, which projects through the side of the casing and is slidably mounted within the slot 18 therein.

Depending from the top of the casing 1 and inclined toward the shafts 9 and 13 are stops 19, preferably formed of parallel fingers, the lower ends of which are adjacent to said shafts. A tailer-board extends downward at an incline from the end shaft 13 to one of the cross-strips 11. Mounted within the casing at one side of the cylinder 5 is a blower 20, inclosed within a casing 21, from which projects a tube 22, which rests upon the floor 12 of the device at a point below the cross-strips 11. This tube is provided with the transversely-extending branch tubes 23, each of which is provided with perforations 24 within the upper surface, and upon which is slidably mounted a perforated plate 25, which may be operated in any suitable manner, as by means of a rod 26, projecting through the side of the casing. The perforations of the plate and tube are adapted to register when said plate is in one position; but said openings may be closed or partially closed through the proper manipulation of the plate. These branch pipes 23 are so arranged as to direct a blast therefrom through each set of fingers 10.

A tube 27 projects downward from the main tube 22 to a point below the floor 12 and is provided with an outlet from which a blast may be directed through a sieve 28, suitably mounted beneath the floor at a point above an inclined screen 29. At the upper edge of said screen and sieve is arranged an inclined gutter 30, which is provided with an outlet into a return-pipe 31, which opens into the hopper 3 at a point above the cylinder 5. At the bottom of the screen 25 is arranged a second gutter 32, which has an outlet-spout 33 at the side of the machine for delivering grain. A plate, as 34, may be secured to the tube 27 below the outlet thereof to properly direct the blast therefrom.

In operation straw is fed into the hopper and is carried into the cylinder 5 onto the apron 6, which conducts the same upward beneath the stop 19, where it is forced downward upon the fingers 10 by the teeth 9 projecting from the shaft. Here the blast from the first distributing-pipe will strike the straw and force the same upward upon the rattle 15, against the second set of stops 19, where it will be delivered upon the next set of fingers 10, and so on, this operation being continued until the straw reaches the last rattle, where the same is blown outward into the stacker by the blast.

It is obvious that the grain will be beaten from the straw in its passage through the machine and the same will be collected upon the sieve 28, where the chaff, &c., will be blown therefrom. The grain will fall upon the sieve 29 and will be delivered upon the outlet-gutter 32. Any tailings which may collect in the machine are discharged into the gutter 30 and out through the return-pipe 31 and into the hopper 3.

In the foregoing description I have described the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. In a threshing-machine the combination with a casing, of a cylinder mounted therein, an apron adjacent thereto, inclined rattles pivoted within the casing, curved fingers adjacent to the free edges of the rattles, stops suspended above said rattles, said apron being inclined upward to deliver the grain below the first of said stops and means for directing an air-blast through said fingers and stops.

2. In a threshing-machine the combination with a casing having a cylinder therein, of an apron adjacent to the cylinder, adjustable inclined rattles within the casing, fingers, projecting upward adjacent to the free edges of the rattles, stops suspended above the rattles, revoluble shafts at the upper edges of the rattles and having teeth projecting therefrom, said apron being upwardly inclined to deliver grain below the first of said stops and means for directing an air-blast through the fingers.

3. In a threshing-machine the combination with a casing having a hopper and a stacker, of a cylinder, an upwardly-inclined apron, adjustable inclined rattles, fingers projecting upward adjacent to the free edges of the rattles, a blower, a tube projecting therefrom and adapted to direct a blast through said fingers, a sieve, below the tube, means for directing a blast through said sieve, an inclined gutter at the upper edge thereof, a pipe connecting the gutter and hopper, an inclined screen below the sieve, and a discharge-gutter.

In testimony whereof I affix my signature in presence of two witnesses.

EDWIN T. SHELLEY.

Witnesses:
HARRY LEE,
JESSE C. SHELLEY.